United States Patent
Vitel (12)

(10) Patent No.: US 6,370,388 B1
(45) Date of Patent: Apr. 9, 2002

(54) TELEPHONY DEVICE TRANSMITTING DIVIDED MESSAGES

(75) Inventor: Sandrine Vitel, Le Mans (FR)

(73) Assignee: U.S. Phillips Corporation, New York, NY (US)

( * ) Notice: Subject to any disclaimer, the term of this patent is extended or adjusted under 35 U.S.C. 154(b) by 0 days.

(21) Appl. No.: 09/119,287

(22) Filed: Jul. 20, 1998

(30) Foreign Application Priority Data

Jul. 29, 1997 (FR) .......................................... 97 09644

(51) Int. Cl.$^7$ .............................................. H04Q 07/20

(52) U.S. Cl. ...................... 455/466; 370/394; 370/473; 370/474

(58) Field of Search ................................ 455/466, 412, 455/413, 414, 415, 422, 550, 566, 575, 15, 517, 462–4; 709/200; 370/397, 428, 394, 473, 474

(56) References Cited

U.S. PATENT DOCUMENTS

| | | | | |
|---|---|---|---|---|
| RE31,182 E | * | 3/1983 | Cragger et al. | 370/428 X |
| 5,533,027 A | * | 7/1996 | Akerberg et al. | 455/15 X |
| 5,652,783 A | * | 7/1997 | Keba et al. | 455/466 X |
| 5,689,501 A | * | 11/1997 | Takase et al. | 370/397 X |
| 5,734,645 A | * | 3/1998 | Raith et al. | 455/466 X |
| 5,748,893 A | * | 5/1998 | Hirata et al. | 709/200 |
| 5,991,633 A | * | 11/1999 | Corriveau et al. | 455/466 |

* cited by examiner

Primary Examiner—William Trost
Assistant Examiner—Philip Sobutka
(74) Attorney, Agent, or Firm—Dicran Halajian

(57) ABSTRACT

The invention discloses a base station connected to the telephone line, at least one handset including, inter alia, a display and means for transmitting CLMS messages defined by the DECT standard. For transmitting data messages of arbitrary length, the device further includes a transmitting part formed by means for dividing the data messages into segments and for transmitting the segments in as many CLMS messages, and a receiving part for displaying the messages on the display.

6 Claims, 3 Drawing Sheets

TELEPHONY DEVICE TRANSMITTING DIVIDED MESSAGES

FIELD OF THE INVENTION

The invention relates to a telephony device comprising:

a base station connected to the switched network, comprising a first management element. formed, inter alia, by a processor assembly, by a memory containing an execution program and by a random-access memory, at least one handset comprising a second management element formed, inter alia, by a processor assembly, by a memory containing an execution program and by a random-access memory, and an output element for returning data, means for transmitting elementary messages of reduced length.

The invention also relates to a method implemented in such a device and also relates to a subscriber terminal suitable for such a device.

The invention finds interesting applications in telecommunication systems implying protocols, this is notably the case with telephony devices satisfying the, for example, DECT standard.

BACKGROUND OF THE INVENTION

Telephony devices of this type often comprising a plurality of handsets offer more and more functions to the user.

One function whose need is felt ever more is the transmission of messages broadcast to the handsets. These messages are most often intended to be displayed on the screen of these devices. The nature of these messages is varied and may be such as currently supplied by the operators to their subscribers or the display of a telephone directory and so on.

A problem posed with this type of broadcasting is that it is to be effected under good conditions as regards reliability to the various subscriber stations concerned, without the use of considerable resources for this purpose.

SUMMARY OF THE INVENTION

The present invention proposes a device of the type mentioned in the opening paragraph which permits of broadcasting to the various subscriber devices messages of varied nature with satisfactory reliability.

Therefore, such a device is characterized in that it comprises means for transmitting data messages having whatever length, formed by:

a transmitting part comprising means for dividing said data messages into segments and for transmitting said segments in as many elementary messages, and a receiving part comprising means for returning them to said output element.

The idea of the, invention comprises the use of the possibility of broadcasting to all the subscriber terminals data by CLMS messages as defined in the DECT standard.

BRIEF DESCRIPTION OF THE DRAWINGS

These and other aspects of the invention will be apparent from and elucidated with reference to the embodiments described hereinafter.

In the drawings.

DETAILED DESCRIPTION OF THE INVENTION

Figure 1:
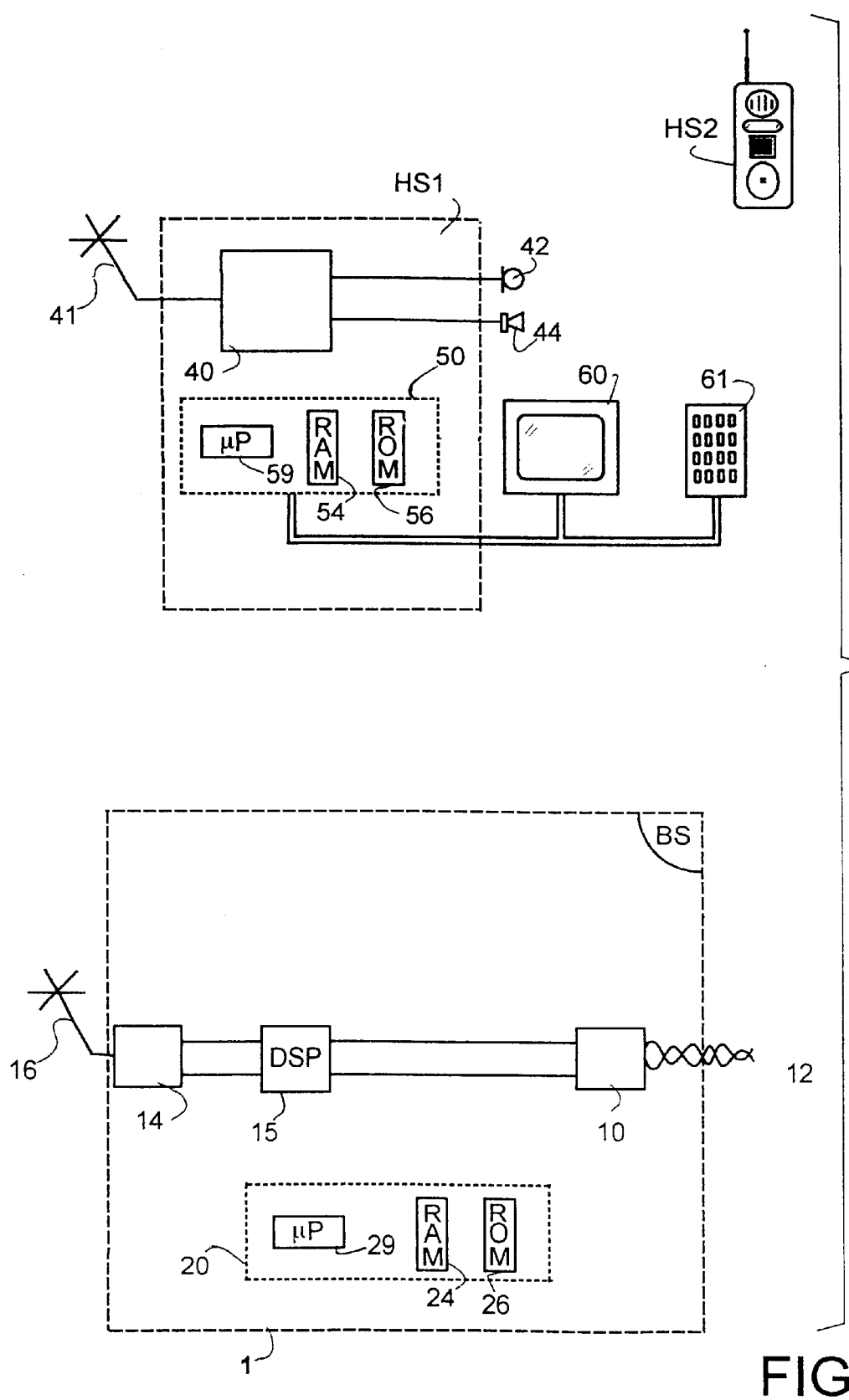
FIG. 1 shows a device according to the invention.

In FIG. 1, the device that is represented is a device satisfying the DECT standards. Reference 1 shows the base station BS to which may be connected by radio a plurality of handsets HS1, HS2 . . . . This base station 1 comprises, inter alia, a line circuit 10 which makes it possible for the base station to be connected to the switched network via a telephone line 12 and a radio circuit 14 which authorizes the dialogue with the various handsets HS1, HS2 . . . by transmitting and receiving waves via an antenna 16. For digitally coding all the analog data which transit inside the basic circuit, a signal processing element 15 is provided formed around a signal processor DSP which processes voice signals in particular.

All the elements of this basic circuit 1 are managed by a microprocessor management element 20. This element is notably formed in usual manner by a random-access memory 24, a read-only memory 26 containing the operating instructions of the device and a management processor 29.

The subscriber terminal HS1 only shown in detail (the handset HS2 may be of identical structure) comprises a communication assembly 40 which includes an antenna 41 which permits the handset to communicate with the base station BS and from there with the other handsets HS2, . . . . This assembly processes the data via the microphone 42 and also produces the signals for a loudspeaker 44. There is also provided a management element 50 formed, just like the management element 20, by a random-access memory 54, a read-only memory 56 which contains the operating instructions of the device and a management processor 59. The handset HSi also comprises a display 60 on which various data are displayed and a keyboard 61. These handsets are mobiles and because of this they are fed by an accumulator (not shown in the FIG. 1).

With this type of device, one wishes to broadcast to the handsets HS1, . . . various messages without any constraint as regards length.

Figure 2:
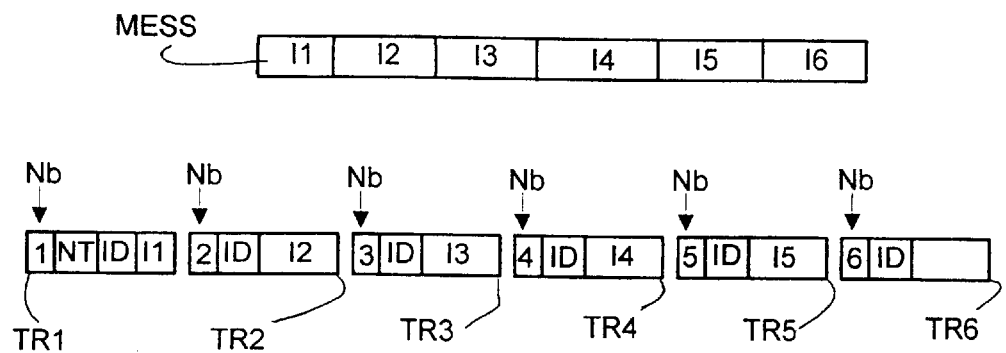
FIG. 2 shows how the data messages to be broadcast are processed.

FIG. 2 shows how a data message MESS of arbitrary length may be broadcast according to the invention.

This message MESS formed by a certain number of binary elements is divided into a certain number, six in this example, of message segments TR1, TR2, TR6 containing each a segment I1, I2, . . . , I6 of the message MESS. To this message is assigned an identification value ID. This value ID is inserted into each of the segments TR1, . . . , TR6. The first segment further contains the value NT (=6) which gives the total number of segments which form the message. Moreover, each segment contains an order number Nb which thus runs from 1 to 6. Each of these segments TR1, . . . , TR6 is formed by 20 octets and is transmitted as a message CLMS defined by the DECT standard and, more precisely, in paragraph 8.3 of the facsimile ETS 300 175-5. That is to say, that they are transmitted in 5 sections containing 4 octets.

Figure 3:
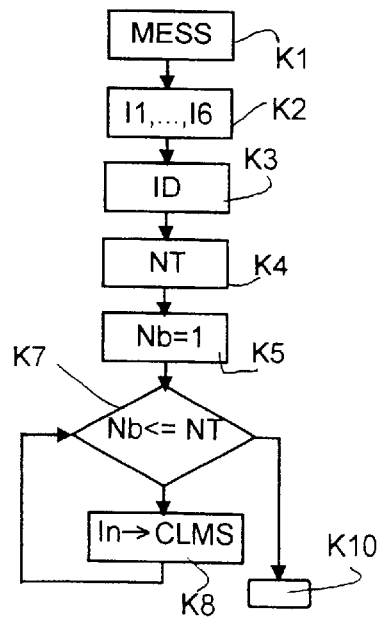
FIG. 3 shows a diagram explaining the operation of the base station.

FIG. 3 shows the operation steps carried out at the level of the base station. These steps are carried out by the management element 20.

Box K1 indicates the reception of the data message MESS to be broadcast to the handsets. Then this data message is divided into segments (box K2) and each of these segments receives an identification code ID (box K3) as this has already been observed. The total number of segments NT is determined for being inserted into the first segment (box K4). The numbering of these segments is initialized as indicated in box K5. A test shown in box K7 permits to stop the process of broadcasting the data message. Each segment is then encapsulated in a message CLMS as indicated in box K8. When the number Nb exceeds NT, the process is then terminated (box K10).

Figure 4:
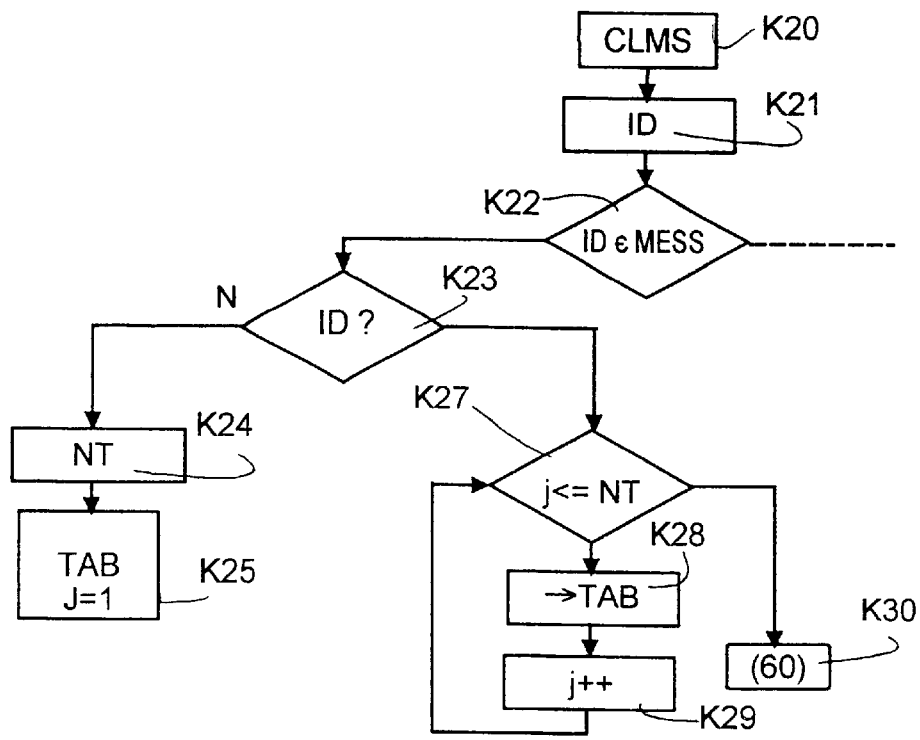
FIG. 4 shows a diagram explaining the operation of a handset.

FIG. 4 shows the operating steps carried out at the level of the handset. These steps are carried out by means of the element 50.

Box K20 indicates the reception of a message CLMS. The identification value ID is tapped (box K21). This value permits of determining whether the received elementary message is an element of a data message of arbitrary length or a service message. This is detected in box K22. If it is a service message, the operation does not form part of the invention and is not described. If it is a data message, then box K23 is proceeded to. There one determines whether a data message having a like identifier ID has already been received. If not, the value NT is tapped (box K24) and a table TAB is opened, box K25, whose dimensions are given by this value NT. In this table, a place is reserved for a variable counter "j" and also for the value NT assigned to this message. If the value ID has already caused a table to be opened, a test is made, as is indicated in box K27, of the value counter j assigned to this data message. If this value is less than the value NT of the message, the received segment is stored (box K28) at the location defined by the number Nb contained in the segment, after which box K29 is proceeded to which shows the operation of incrementation of this value counter j. If the test of the box K27 is negative, then this is to say that the whole message has been received, thus that the table is emptied so that the message can be read on the display 60 (box K30).

What is claimed is:

1. A telephony device comprising a handset and a base station which communicates with said handset to exchange a variable length data message; wherein said variable length data message is assigned an identification number and is divided into fixed length segments to form elementary messages prior to transmission, a first one of said elementary messages including a total number of said fixed length segments, wherein each of said elementary messages includes said identification number of said variable length data message, and wherein said handset is configured to initialize a variable counter and to form a table having dimensions equal to said total number of said fixed length segments upon reception of said first one of said elementary messages, wherein additional ones of said elementary messages having said identification number are stored in said table until said variable counter is greater than said total number of said fixed length segments, wherein said variable length data message may be received by said handset as a plurality of said elementary messages.

2. The telephony device of claim 1, wherein each of said elementary messages further includes an order of said elementary messages.

3. The telephony device of claim 1, wherein said elementary messages are numbered sequentially in an order to form said variable length data message.

4. The telephony device of claim 1, satisfying the DECT standard, wherein said fixed length segments are CLMS service messages.

5. A method of transmitting a variable length data message between a handset and a base station comprising:

dividing said variable length data message into fixed length segments;

forming elementary messages from said fixed length segments prior to transmission;

including an identification number of said variable length data message in each of said elementary messages;

including a total number of said fixed length segments in a first one of said elementary messages;

transmitting said elementary messages;

upon reception of said first one of said elementary messages, initializing a variable counter and forming a table having dimensions equal to said total number of said fixed length segments; and storing in said table additional ones of said elementary messages having said identification number until said variable counter is greater than said total number of said fixed length segments.

6. The method of claim 5, further comprising including an order of said fixed length segments in said elementary messages.

* * * * *